United States Patent Office 3,404,273
Patented Oct. 1, 1968

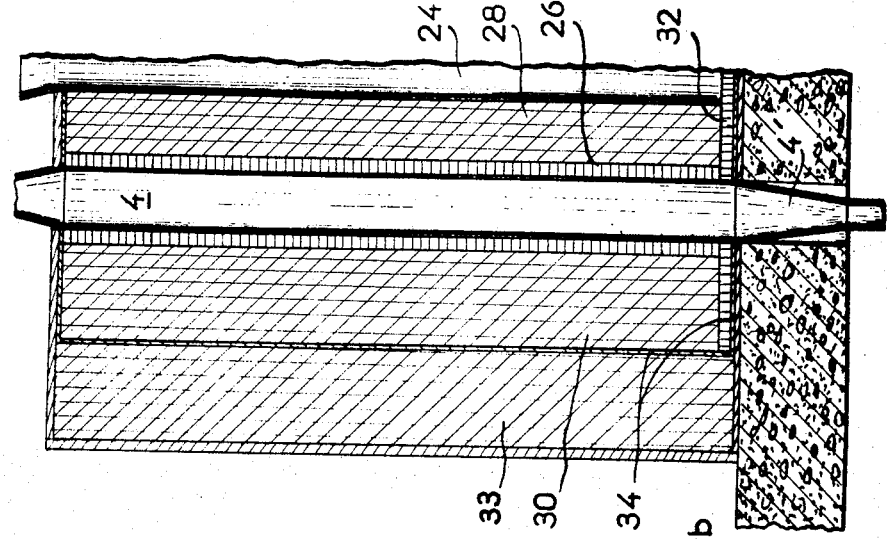
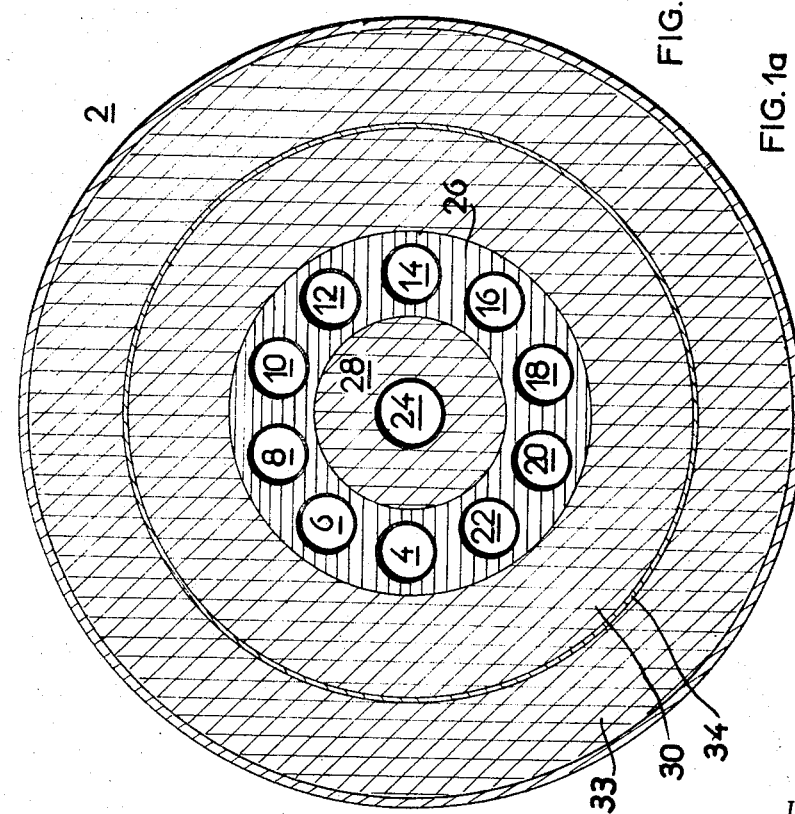

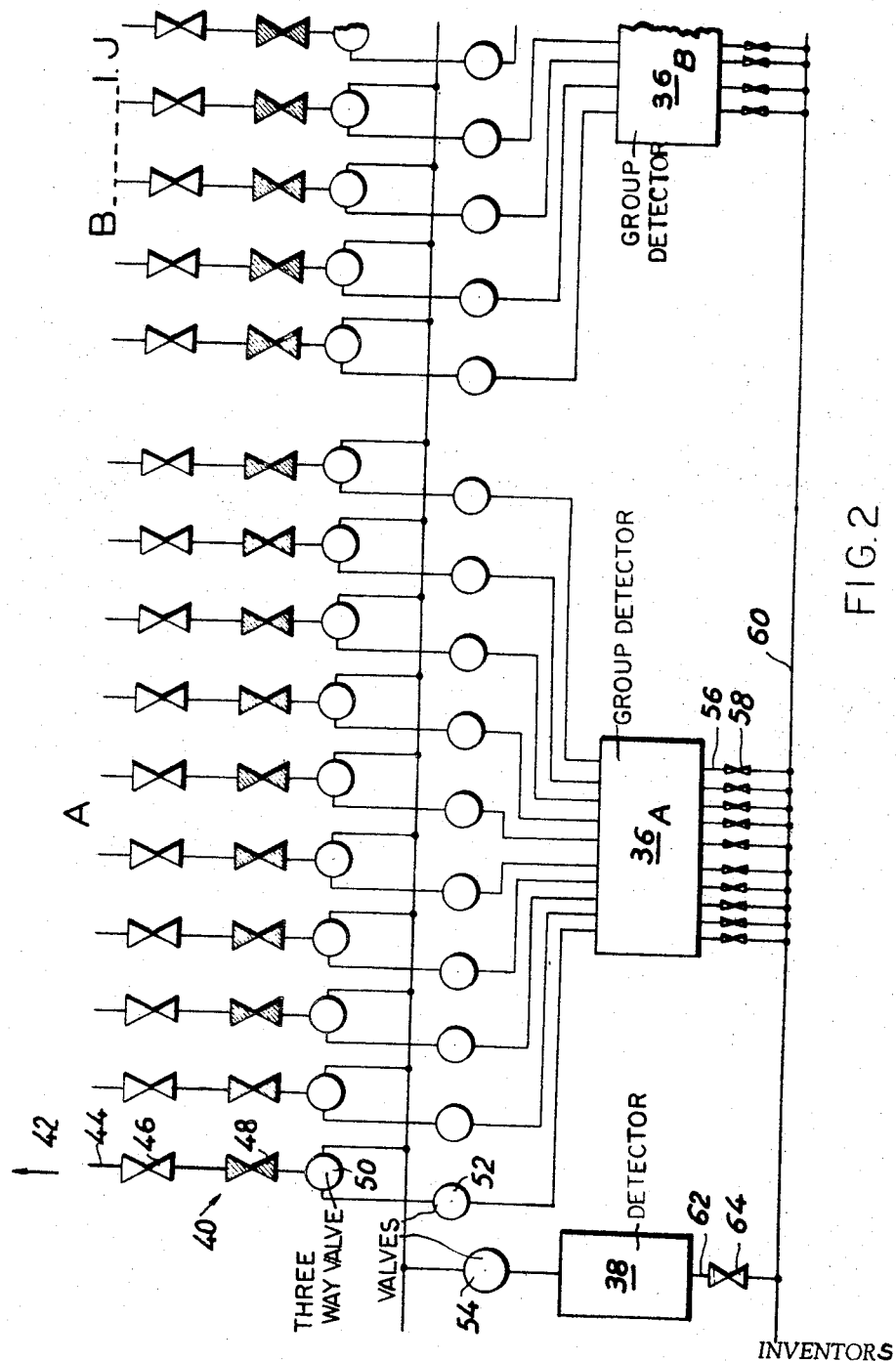

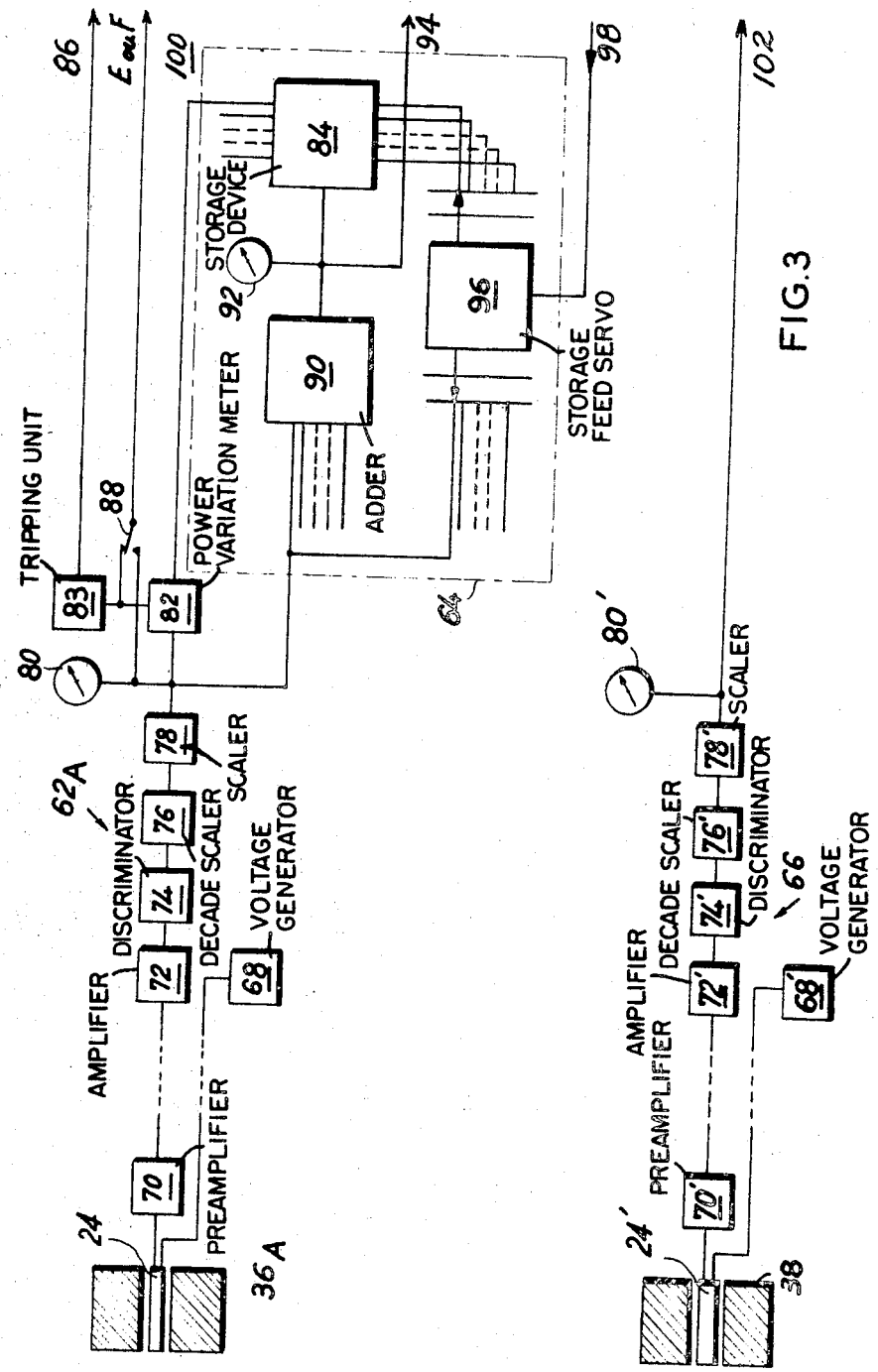

3,404,273
DEVICE FOR MEASURING THE CONCENTRA-
TION OF FISSION PRODUCTS IN SUSPEN-
SION IN A FLUID
Paul Douet, Savigny-sur-Orge, and André Roguin, Antony,
France, assignors to Commissariat à l'Energie Atomi-
que, Paris, France
Filed Jan. 28, 1965, Ser. No. 428,802
Claims priority, application France, Feb. 7, 1964,
963,092
4 Claims. (Cl. 250—83.1)

ABSTRACT OF THE DISCLOSURE

The present invention relates to an apparatus for monitoring fluid streams in order to detect radiation emanating from said streams as an indication of the concentration of fission products carried therein. The invention is particularly adapted for use in a system which senses the presence or occurrence of ruptured fuel element cans in a nuclear reactor. The apparatus of the present invention basically includes a neutron detector around which are arranged a plurality of identical sample pipes. The sample pipes are disposed parallel to the longitudinal axis of the cylindrical counter, all being equidistant therefrom, and are embedded in a lead sleeve. Each of the sample pipes is connected to a different channel of the nuclear reactor whereby a plurality of separate samples, each from a different channel, may be simultaneously monitored. An outer sleeve of neutron-moderating material lined with cadmium foil may be used to shield the detector from exterior neutrons and an inner sleeve of neutron-moderating material may be used between the outer sleeve and the lead sleeve as a reflector.

---

The present invention relates to a device for measuring the concentration of fission products in a fluid which circulates in a plurality of separate ducts and has as its main field of application the burst can detection gear employed in nuclear reactors.

When an accidental fissure occurs in a fuel element can, the fission fragments which pass through said fissure are carried away by the cooling fluid which it is desired to analyse. A certain number of these fission fragments tend towards a state of equilibrium by emitting neutrons, the longest half-lives of such fragments being of the order of several tens of seconds. It is convenient in particular to utilize the delayed neutrons, the longest emission period of which is in the vicinity of 55 seconds, for the purpose of detecting outside the reactor the presence of fission products in the coolant.

Measuring devices are already known which make use of the emission of delayed neutrons by fission fragments, and in which the detection of these neutrons is effected by means of a boron trifluoride counter. When it is desired to measure the contamination of a fluid by this method, the fluid is conveyed into a so-called sampling pipe which is located in the vicinity of the counter.

Devices of the type referred-to can be fitted in the burst can detectors employed in nuclear reactors, in which samples of cooling water derived from different reactor channels are mixed before being circulated in proximity to the counter.

In burst can detectors of this type, it is difficult to obtain equivalent responses in respect of equal concentrations of fission products which are derived from different samples. These difficulties are due among other factors to defective mixing of these samples, to a poor balancing of the flow rates within the sampling pipes and to a high background count caused by the appreciable density of extraneous radiation throughout the entire quantity of mixture in the presence of the detector. Moreover, the particular information contained in each sample is completely and irretrievably lost after the mixing process. This loss usually results in the use of two analyzing channels with which are associated switching or changeover means.

The measuring device in accordance with the invention also makes use of the detection of delayed neutrons emitted by the fluid under analysis but is not subject to the disadvantages which have just been noted.

This invention is particularly characterized in that a plurality of pipe sections through which are circulated samples of fluid derived from different sources is placed round a neutron detector, the respective arrangement, dimensions and fluid supply of the said pipe sections being so determined that the response of said detector to a given concentration of fission products in any one of the pipes is substantially the same irrespective of the pipe considered.

The device in accordance with the invention is further characterized in that it can comprise either in combination or separately:

(a) Means for reducing the amplitude of spurious signals emitted by the detector as a result of the mutual influence of the gamma-ray emissions of each section, (b) Means for shielding the detector and the pipe sections from radiation and neutrons derived from the exterior and (c) Means for increasing the sensitivity of the detector by reducing losses in delayed neutrons which can be utilized.

According to a particularly advantageous form of embodiment, the device in accordance with the invention is more especially characterized in that $n$ identical cylindrical pipe sections through which are circulated samples of fluid derived from different sources are disposed parallel to the longitudinal axis of a cylindrical neutron counter in a geometry of $n$ order about the said axis.

Apart from the main arrangements which have just been described, the invention comprises the secondary arrangements which relate to:

(a) A lead sheath in which the pipe sections are embedded, and which serves to reduce the spurious signals of the counter as a result of the mutual influence of gamma-ray emissions of each of the said sections, (b) An outer sleeve of neutron-moderating material lined internally with cadmium foil which surrounds all the pipe sections, thus shielding the said pipe sections as well as the counter from neutrons derived from the exterior, as well as (c) A sleeve of neutron-moderating material which performs the function of reflector and which is placed between the assembly of pipe sections and the sleeve of neutron-moderating material which is lined with cadmium foil.

The measuring device in accordance with the invention is particularly suitable for the economic application of a can burst detector for a heterogeneous nuclear reactor in which the concentration of fission products in the cooling fluid is monitored by measuring the neutron activity of said fluid by means of a plurality of detectors or so-called group detectors which are each assigned to a number of channels, and by means of a follow-up detector or so-called "burst follower" which seeks and identifies a suspect channel when a group detector has detected excessive activity, then continuously monitors this channel as soon as it has been selected.

The device in accordance with this invention meets with a valuable application in the operation of a burst can detection facility in accordance with French Patent No. 1,185,212 in the name of the present applicant (No. C.E.A. D 303 which was filed on the one hand in Japan, in the Netherlands and in Sweden as well as, on the other hand, in Germany, Belgium, Canada, United States, Great Britain, Israel, Italy, Luxembourg, Switzerland, the said patent having been granted in the last-named countries) in respect of "Improvements in devices for monitoring leaks in gas-cooled nuclear reactors." The measuring device in accordance with the present invention in fact permits the possibility of continuously delivering a fine-control signal by adding the count rates of the different group detectors.

As has already been pointed out, the use of the measuring device in accordance with the invention as group detector in a burst can detector assembly for heterogeneous reactors provides a substantial economic advantage in that it permits an appreciable reduction in first cost of this apparatus. This reduction is due in particular to the simplification of the circuit and related piping systems as well as a reduction in the number of valves and electrovalves, and also the elimination of part of the electronic equipment.

The method according to the invention for the operation of a burst can detector for nuclear reactors further extends the advantage previously indicated by reason of the fact that this device only comprises group detectors and follow-up detectors and that a general detector is no longer required.

In order that the characteristic features of this invention may be more readily understood, one example of embodiment will now be described below, it being understood that this example is not given in any sense by way of limitation in regard to either the method of operation or potential applications thereof.

In the accompanying drawings:

FIGS. 1a and 1b represent respectively views in transverse cross-section and in longitudinal cross-section of a device for measuring the concentration of fission products in a fluid, the said device being constructed in accordance with the invention.

FIG. 2 represents diagrammatically the fluid-circuits of a burst can detector for heterogeneous nuclear reactors, in which use is made of the measuring device of FIG. 1.

FIG. 3 is an electronic diagram of a burst can detector for heterogeneous nuclear reactors, which is intended to be utilized in accordance with the method contemplated by this invention.

The device 2 of FIGS. 1a and 1b is designed to measure the total fission-product concentration of the fluid which is circulated within pipes such as 4, 4' (as shown in FIG. 1b) which each comprise an enlarged section 4, 6, 8 . . . 20, 22 (as shown in FIG. 1a), each enlarged pipe section being disposed parallel to the longitudinal axis of a cylindrical counter 24 of the boron trifluoride type. It should be noted that the enlarged pipe sections are angularly spaced in uniform relation round the counter and at equal distance from this latter. The combined assembly of pipe sections is embedded in a lead sheath 26. Finally, the said sheath is fitted between two sleeves of neutron-moderating material, in this case polyethylene, the first sleeve 28 being intended to fill the space between the counter and the lead sheath and the second sleeve 30 of polyethylene being adapted to surround the lead sheath. A screen 34 formed of cadmium foil is placed round the sleeve 30 of neutron-moderating material, the said screen being in turn surrounded by a third sleeve 33 of neutron-moderating material. It should be noted that a lead plate 32 (as shown in FIG. 1b) is applied against the sleeve 30 at that extremity of the measuring device which is located near the outlets of the pipes through which the fluid being monitored is discharged.

The fluid-circulation system of a burst can detector for a heterogeneous reactor to which the measuring device 2 of FIGS. 1a and 1b is particularly suited is shown in FIG. 2. The moderator employed in the exemplified reactor is heavy water which also serves as cooling fluid. This reactor has 100 channels to which are joined a corresponding number of pipes for sampling the said cooling fluid, in which the concentration of fission products is measured with a view to detecting any possible can burst. The 100 sampling pipes are arranged in ten groups A, B . . . J (as shown in FIG. 2) which are monitored by a group detector ($36_A$, $36_B$ . . . $36_J$) consisting of a measuring device as illustrated in FIGS. 1a and 1b. When the fission product concentration which corresponds to the neutron activity as measured by one of the group detectors is abnormally high, the fluids circulating in each sampling pipe of the group are automatically or manually switched in sequence towards the follow-up detector 38, the practical design of which is similar to that of a group detector. As soon as it is isolated, the suspect channel is continuously monitored by the follow-up detector.

There will now be examined the fluid-circuit 40 which joins the channels (channel 42 which is not shown, for example) to the detector. Each of these circuits consists of a sampling pipe 44 fitted with an isolating cock 46, a regulating cock 48 as well as an electrically operated three-way valve 50 which serves to connect the said channel to a group detector $36_A$ or to the follow-up detector 38 via a flow meter (52 to 54). The fluid-circuit 40 extends beyond the group detector in the form of a pipe 56 fitted with an isolating cock 58 and is joined to the manifold 60 for return to the main circuit. It should be noted that the sampling pipe which is switched towards the follow-up detector is similarly joined to the return manifold by means of a pipe 62 fitted with an isolating cock 64.

The count rate of each group detector measures the total instantaneous activity F of the channels to which are joined the sampling pipes which pass through the detector. However, in order to detect any abnormal activity within one group of channels, it is not sufficient to compare the instantaneous activity F with the activity $F_0$ of the same channels at a given reference instant $t_0$ since the slow variation of the reactor power must also be taken into account starting from the reference instant. Accordingly, the activity $F_0$ at the reference instant must be multiplied by the fine-control factor $\alpha/\alpha_0$ which is proportional to the ratio of the total activity of the reactor channels to the total activity of the said channels at the reference instant. The power-variation E of the group of channels is given by the expression:

$$E = F - F_0 \frac{\alpha}{\alpha_0}$$

This value is calculated by means of a power-variation meter. The signal which represents this value is intended to trip a pre-warning or warning alarm if its amplitude reaches either one or the other of two predetermined threshold values.

In accordance with an essential characteristic feature of the invention, the fine-control factor $\alpha/\alpha_0$ is determined by taking the mean value of the simultaneous count rates of each group detector. There is therefore no need to employ a general detector as is frequently the case when electrostatic collection is employed.

FIG. 3 is an electronic diagram of a burst can detector for nuclear reactors, in which use is made of a fluid circuit for distributing samples of cooling fluid between the detectors in accordance with the diagram of FIG. 2, and which entails the application of the mode of operation indicated earlier, wherein the use of a general detector is dispensed with.

The electronic equipment of the reactor comprises a channel ($62_A$ for example) which is associated with each group detector ($36_A$) and which measures the total instantaneous activity F and power variation E of the corresponding group, a computer unit 64 which is common to all these channels and a channel 66 for measuring the activity of the reactor channel being monitored by the follow-up detector 38.

The channel $62_A$ is connected to the boron trifluoride detector 24 of the group detector $36_A$. It should be noted that this counter is supplied from a high-tension generator 68. The output electrode of the counter is connected to a preamplifier 70 which is followed by an amplifier 72; the stray pulses produced by the amplifier are eliminated by a discriminator 74, and the pulses transmitted by the said discriminator are applied to a decade scaler 76 as well as to a scaler 78. The signal which appears at the output of this device measures the total activity of the channels of the group which are monitored by the detector $36_A$ and is transmitted to an indicating instrument 80, to one of the inputs of a power-variation meter 82 as well as to the computer unit 64. The second input of the power-variation meter is coupled to a storage device 84 which forms part of the said computer unit 64 and which transmits to the power-variation meter the information relating to the fine-control factor as well as to the activity of the group of channels at the reference instant. The signal produced by the said power-variation meter 82 is transmitted to a tripping unit 83 of the type comprising thresholds as defined earlier, which controls an alarm system 86 (not shown) which forms part of the control panel 100 located at a distance from the channels $62_A$ and 66. A two-way switch 88 serves to transmit to the control panel one of the signals which represents the power variation or activity of the group which is being monitored.

The computer unit 64 which is common to the channels for computing activity and power variation and which is associated with each group detector comprises an adding device 90, the inputs of which are coupled to the scalers of each of the said channels. The signal produced by the said adding device is transmitted to a storage device 84, to a first indicating instrument 92 as well as to a second indicating instrument 94 which forms part of the control panel. Finally, the computer unit 64 further comprises a storage feed servo-mechanism 96 which serves to record in a storage device 84 the total activities of each channel. The operation of this device is controlled by a signal 98.

The channel which is associated with the follow-up detector comprises a number of different elements which are similar to those of each channel associated with a group detector, the said elements being designated by the same reference numerals as the preceding, to which are assigned the prime index ('). It should be noted that the channel last mentioned is not provided with either a computer unit such as the unit 64 or a power-variation meter such as the meter 82; the signal which is produced by its scaler is transmitted to an indicating instrument 102 which forms part of the control panel.

A measuring device of similar design to that of FIGURES 1a and 1b as constructed by the present applicant consists of ten sections 4, 6 . . . 20, 22 having a height of 500 millimeters and a diameter of 40 millimeters and is disposed round the counter in a circle 210 millimeters in diameter.

What we claim is:

1. A device for monitoring the concentration of fission products in fluid by detecting delayed neutrons emitted by sample fluid, comprising,
   a radiation detector sensitive to delayed neutrons,
   a cylindrical sleeve of radiation shielding material surrounding said detector,
   a plurality of fluid sample conduits embedded within walls of said cylindrical sleeve, the longitudinal axes of said conduits being oriented parallel to the longitudinal axis of said radiation detector and a constant distance therefrom whereby the response of said detector to each fluid sample is substantially uniform for a given fission product concentration.

2. A device as set forth in claim 1 wherein said cylindrical sleeve is lead and is surrounded by an outer sleeve of neutron-moderating material which is lined internally with a layer of cadmium.

3. A device as set forth in claim 2 further including a layer of neutron-moderating material disposed between said cylindrical sleeve and said layer of cadmium.

4. A device as set forth in claim 3 further including a layer of neutron-moderating material disposed between said radiation detector and said cylindrical sleeve.

References Cited

UNITED STATES PATENTS

| | | | |
|---|---|---|---|
| 3,121,789 | 2/1964 | McGrath | 250—108 X |
| 3,264,477 | 8/1966 | Hall | 250—108 X |
| 3,293,434 | 12/1966 | Dexter et al. | 250—83.1 |

ARCHIE R. BORCHELT, *Primary Examiner.*